United States Patent
Barrameda et al.

(10) Patent No.: US 6,216,115 B1
(45) Date of Patent: Apr. 10, 2001

(54) METHOD FOR MULTI-DIRECTIONAL CONSUMER PURCHASING, SELLING, AND TRANSACTION MANAGEMENT

(76) Inventors: Benedicto Barrameda; Paula Barrameda, both of 20 Highland Ave., Maplewood, NJ (US) 07040

( * ) Notice: Subject to any disclaimer, the term of this patent is extended or adjusted under 35 U.S.C. 154(b) by 0 days.

(21) Appl. No.: 09/161,633

(22) Filed: Sep. 28, 1998

(51) Int. Cl.[7] .................................................. G06F 17/60
(52) U.S. Cl. ................................ 705/40; 705/38; 705/39; 705/42
(58) Field of Search ......................... 705/40, 38, 39, 705/42

(56) References Cited

U.S. PATENT DOCUMENTS

| | | | |
|---|---|---|---|
| 3,697,693 | * 10/1972 | Deschenes et al. | 179/2 DP |
| 4,947,028 | * 8/1990 | Gorog | 235/381 |
| 5,126,936 | * 6/1992 | Champion et al. | 364/408 |
| 5,231,569 | * 7/1993 | Myatt et al. | 364/408 |
| 5,592,376 | * 1/1997 | Hodroff | 395/214 |
| 5,611,052 | * 3/1997 | Dykstra et al. | 395/238 |
| 5,650,761 | * 7/1997 | Gomm et al. | 235/381 |
| 5,774,882 | * 6/1998 | Keen et al. | 705/38 |
| 5,884,325 | * 3/1999 | Bauer et al. | 707/201 |
| 5,920,847 | * 7/1999 | Kolling et al. | 705/40 |
| 5,930,363 | * 7/1999 | Stanford et al. | 380/24 |

OTHER PUBLICATIONS

'Cyber banking gets serious', Jan. 1997, v34, n1, p30(2). Gale Group Trade & Industry DB [online]. Communications News. Retrieved from: Dialog, Dialog Accession No. 09362645.*

Conlin, J. 'Cashing out', Dec. 1996, SMT supplemental, pp. 26–31, ABI/Inform ® [online]. Sales & Marketing Management.. Retrieved from: Dialog. Dialog Accession No. 01343997.*

'Australian payment cards look to smark future', May 1999. Gale Group Computer DB ™ [online]. Newsbytes, NA. Retrieved from: Dialog. Dialog Accession No. 02295238.*

'A question of trust (electronic commerce and network security)', Jul. 1997, pVII (1). Gale Group Computer DB ™ [online]. Computer Weekly. Retrieved from: Dialog.. Dialog Accession No. 02091735.*

Aslam, T. 'Protocols for e–commerce', Dec. 1998, v23, n12, p. 52 (5). Gale Group Computer DB ™ [online]. Dr. Dobb's Journal. Retrieved from: Dialog Information. Dialog Accession No. 02255905.*

Messmer, Ellen; Credit Card Firms Plan "Digital Money" Future; Network World v12n17 pp47,103, Apr. 1995.*

* cited by examiner

*Primary Examiner*—Eric W. Stamber
*Assistant Examiner*—Anne Teitelbaum
(74) *Attorney, Agent, or Firm*—George W. Dishong

(57) ABSTRACT

An integrated credit card data processing method that allows transactions to be processed either as a payment or as a receipt of payment. The new process is a combination of the regular data processing method for consumer purchases of goods and services similar to those used by credit/charge cards, debit cards, and smart cards and a merchant processing method that allows acceptance of such payments. The second part of the invention is a method to execute an order on the manner of disposition of the proceeds of sale, such as payment by check, application of the excess cash to outstanding debts, investment into a plurality of investment accounts, or retention of the proceeds as a credit to the account. The third part of the invention is a method to provide a report of both purchases and sales itemized together for an account holder.

9 Claims, 5 Drawing Sheets

TRANSACTION SUMMARY

INVESTMENT ACCOUNT SUMMARY

METHOD FOR MULTI-DIRECTIONAL CONSUMER PURCHASING, SELLING, AND TRANSACTION MANAGEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. §1.72(e).

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates to providing the consumer with a "multi-directional" payment facility. More particularly, this invention relates to a financial process that a consumer can use either as a means of purchasing goods and services or as a means of accepting payment as a merchant selling goods and services. Currently, the two systems exist separately. Although the systems embodying payment methods are diversified and well developed, the systems embodying payment acceptance (merchants accepting payments) are often part of, but separate from, the various payment methods. These payment acceptance systems are equally well developed but not so widely available to the average consumer. Most particularly, this invention relates to merging the two functionalities thereby allowing for multi-directional payment processing available to the consumer.

2. Description of Related Art

The many financial processes available today to the end user consumer have single-directional payment methods. A vast majority of these processes are payment methods that provide convenient means of purchasing goods and services. For example, credit and charge cards allow purchases of goods and services on credit or deferred payment. New processes involving debit cards and smart cards make payment more convenient by not having to carry and use cash or checks. E-cash and other payment methods in cyberspace provide convenient means for movement of cash and purchases of goods and services electronically. These payment methods provide access and convenience to the consumer and enhance commerce. These financial processes are meant for consumers and commercial establishments to use as payment methods to purchase goods and services or as a means for moving money. Conversely, credit/charge cards are the cornerstone for businesses to accept payment for goods and services.

All of these processes have one thing in common. They are all single-directional, that is, all of these processes handle a flow of transactions emanating from the consumer's purchase and flowing to the merchant that produces and sells the goods and services. None of the existing processes today are capable of handling multiple directional flow of financial transactions where the direction is different from or opposite to the traditional transaction. For example, a consumer uses the credit card to make purchases but cannot use the same card to make a sale (i.e. accept payment). Today's cutting edge technology merely enhances current payment methods but is nevertheless single-directional. Smart cards, for example, are used to make payments but cannot be used to accept payments. There are no known financial processes today that provide for multi-directional transaction processing. There are no known financial processes that allow the average household consumer to engage in commercial transactions as a seller or merchant and accept credit/charge cards, debit cards, and smart cards while at the same time allowing the traditional purchasing transactions. A consumer may become a credit/charge card accepting merchant by applying for a merchant facility with one or more of the credit card institutions such as Visa, MasterCard, Discover, and American Express.

U.S. Pat. No. 5,569,897 discloses a system or method for producing more credit cards faster and safer. U.S. Pat. No. 5,585,787 allows one credit card to function like several credit or debit cards. Other prior art in the field of the instant invention serve the sole purpose of providing convenient and accessible consumption. U.S. Pat. No. 4,346,442 combines the features of a Visa credit card and investment and brokerage accounts for the purpose of utilizing free cash balances for payment of credit card purchases. U.S. Pat. No. 5,206,803 allows an account holder to charge as much as 40% of the balances of her/his 401(k). The result of this process is the use of funds designated for use upon retirement for present consumption. U.S. Pat. No. 5,083,270 is directed towards exploiting any asset with value by freeing its cash value for eventual release as loans without selling the asset. U.S. Pat. No. 5,083,270 does not disclose using the proceeds to finance commercial activities because such needs are served by various other financing schemes. What makes U.S. Pat. No. 5,083,270 unique is that it is directed towards the average consumer for the purpose of availing of the present and future value of an asset to finance day-to-day consumption. Assets such as real estate, works of art, and other valuable collections may potentially be completely depleted by releasing their value as loans to finance various consumer uses. U.S. Pat. No. 4,642,768 and U.S. Pat. No. 4,722,055 disclose releasing value of an asset but are centered on insurance policies. The net effect of a process following these patents is to consume present and future value of insurance policies which are originally set up to accumulate value and are methods of saving for the future. The patents cited show a diversified but linear approach to developing existing payment methods. They are all directed towards developing systems that handle a single-directional flow of transactions.

Single-directional payment methods cannot truly replace cash because they do not have the flexible properties of cash. Cash can travel in any direction, from consumer to consumer, merchant to consumer, consumer to merchant, merchant to merchant. Cash also stores value and retains its intrinsic value. Current payment methods perform but a fraction of what cash can do. In their present state, current payment methods flow from a consumer to a merchant and nothing more. Therefore it is impossible for current payment methods to displace cash entirely. The notion of a cashless society is not feasible with existing processes without altering the processes significantly to acquire more properties akin to cash. This new invention adds functionalities to existing payment methods by drawing from other existing methods that mimic some of the properties of cash. By merging functionalities, a new financial process is created that mimics cash. A second part of this invention further extends the functionality of the new process by allowing the proceeds to move either freely or systematically between the ordinary consumer accounts and the traditional brokerage accounts. A process that can perform all the properties of cash and offer more capabilities may truly eliminate the need for cash.

A financial process capable of handling multi-directional transaction has a significant economic impact. Single-directional processes such as those previously mentioned provide convenient means of purchasing goods and services and enhance economic growth through increased consumption. However such consumption has to be financed by some resource. Often such transactions are financed by revolving credit or debt or utilization of existing assets. This type of growth is not real growth in the sense that it increases the real wealth of the consumers. On the contrary, for some of the processes, they deplete real wealth. Real wealth of the average consumer can only be increased by increasing productivity and income. Today's processes benefit consumers by providing convenience but do not really help in improving overall economic well being. The effect of the current invention is to create and increase real wealth by empowering the average consumer with the means of accepting alternative means of payment and enabling the consumer in engaging in entrepreneurial commercial activities as a merchant or seller.

Equipment supporting current payment methods is very well developed. There is a wide variety of capabilities such as split dial capabilities that allow a terminal to dial into various merchant processors as instructed by the initiating credit card, charge card, debit card or smart card. Like credit cards and other existing payment methods, the equipment also performs the sole function of handling a singular transaction flow. Credit card processing terminals handle payment transactions from a purchaser to a buyer. More recent developments with cash dispensing machines expand the functionalities from dispensing cash to handing out information and other products (e.g. stamps). But no equipment exists today that can handle buy-sell and sell-buy transactions at the same time.

This invention touches on several fields. The core process or method is within the field of credit card processing systems. The closest prior art in this field is U.S. Pat. No. 5,740,427. Although the conceptual framework of this new invention has some resemblance to the debits and credits used in an accounting system embodied in U.S. Pat. No. 5,740,427, its application and functional parts are extremely different. U.S. Pat. No. 5,740,427 concerns the management of accounting transactions. In contrast, this new invention concerns processing of credit card transactions and involves several financial institutions to complete the process.

This invention also touches on the field of class 705: Data processing: Financial, Business practice, Management, or Cost/Price Determination. In this field, U.S. Pat. No. 5,727,249 discloses automating the generation of drafts as means of payment and has no significance to this new invention. Also touched by this invention is class 364#408-Electrical Computers and Data Processing Systems. In this field, U.S. Pat. No. 4,694,397 discloses a system that interfaces a regular banking system with a brokerage account. Also, U.S. Pat. No. 5,649,116 discloses an integrated decision management system. The instant invention also links banking transactions with a brokerage account, with the additional capability of specifically dealing with transactions that could not have been anticipated by U.S. Pat. No. 4,694,397 or U.S. Pat. No. 5,649,116 or any prior art concerning methods or systems linking or managing brokerage accounts. This is because the transactions generated by this invention are generated mostly by credit card transactions in which the credit card holder is the merchant receiving payment. This concept of a consumer using her/his credit cards to receive payments as a merchant is novel to this invention and could not have been anticipated by other prior art involving brokerage accounts.

Any new payment method must either be compatible with equipment already in place handling payment processing or requires new equipment to be developed. Developing new equipment to handle multi-directional transactions is not only very expensive but also makes the new method more difficult to be broadly accepted and therefore unattractive. Seamless transition from a single-directional environment to a multi-directional environment is necessary to make the proposition succeed. The solution to this problem is a gradual transition towards more sophisticated equipment. What is needed is a process that transcends the underlying equipment, and is appropriate for use now and with later equipment innovations.

BRIEF SUMMARY OF THE INVENTION

The present invention is aimed at bringing to the household consumer a means for accepting non-cash payment for the sales of goods and services as a merchant or entrepreneur, in combination with the use of a credit/charge card and debit card, and providing a means for investing proceeds of the transactions in various investment options.

The combination of existing processes into one process coupled by a new method to maximize idle account balances not only produces unexpected and surprising results, but also produces new processes that are necessary to support the end result. First, the combination of the payment systems results in the merger of the various revenue streams from each system. As a result of the merged revenue streams, merchant processing, a process not currently feasible to offer to every household and currently available only to commercial establishments because of the high cost associated with the facility, becomes economically feasible and profitable to offer to every household for a wide variety of applications of day to day commercial and personal activities. For example, by current standard, a small farmer with very minimal credit card business cannot be allowed to accept credit or charge card payments for the sale of his produce because the financial institutions processing such transactions cannot make a profit on the farmer's business. This stymies the small farmer because he or she cannot engage in interstate commerce without leaving the farm by selling home made products through mail orders, phone or fax orders, or through on-line commerce such as the internet. The merger of the processes into one process merges revenue streams that will result in overcoming this limitation. For example, credit card companies often make a profit from credit card holders. At the same time, the merchant processing companies make a profit from the merchants' acceptance of the credit card payments. In the farmer's case, the profit that the bank earns from the farmer's credit card transactions is merged into the revenue stream generated by his activities as a farmer merchant. The two revenue streams are factored into the calculation of the profitability of making the farmer a credit card accepting merchant. In addition, this new process merges the revenue streams from brokerage activities. As a result, this new invention allows the farmer to engage in all of these transactions. The empowerment snowballs into more earnings for the farmer because this new process provides a computer assisted financial management system that allows the farmer to maximize profits.

Second, the combination of the three processes results in a new dimension of prospective accounts. A new process emerges for the selection and evaluation of accounts that allows broader coverage of household consumers. Credit/charge card issuing banks issue credit facilities only to the credit-worthy consumer. This is because credit/charge processes rely exclusively on the usage of the credit facility. In contrast, this new invention does not rely exclusively on credit worthiness or credit usage. It has several revenue streams from which it draws its economic viability. While credit worthiness is one of its features, eligibility for usage of this invention is not dependent on credit usage and therefore credit worthiness is not the sole criterion for selecting viable accounts. With this new method, households that normally would not qualify for today's financial processes and services because of tainted financial history (e.g. recent bankruptcy filing) may have access to an even more powerful financial tool because the criteria of selection and evaluation take a different dimension.

Also, the resulting new process provides opportunity for wealth accumulation in a manner not currently available because wealth creation in the use of credit/charge card or debit card facility does not currently exist. Finally, financial transactions that are normally conducted in cash and checks and not normally recorded and taxed can be recorded, reported, and taxed. Thus, this new process not only increases real wealth for the consumer but also allows for more accurate accounting and tax collection.

This new process further provides for generating and using funds for investing into various investment schemes by linking the processing systems into a method for payment that includes an option of placing the funds in investment vehicles. This part of the instant process includes reporting transactions through a single reporting system that combines all transactions within the account as well as transactions from the investment accounts.

The need for this present invention, especially the wealth generation and investment options, continues to grow with the ever-increasing consumer debt. At the end of 1994, the average household owed $4,800 in credit card debts, more than double from $2,340 five years ago. About 290 million accounts were delinquent in 1994 and turned over to debt collectors. By the first quarter of 1995, the American Bankers Association reported that credit card delinquencies hit the highest level in 15 years. Household borrowing stood at $1.1 trillion by the first quarter of 1996, an amount equal to Britain's entire gross domestic product. This does not include other debts incurred by the average household. The majority will have other more conventional debt such as student loans, car loans, and home mortgages. More consumer debt means less money available for other needs. More debt means more interest accrued, which rolls over as more debt. Coupled by declining wages and downsizing of the workforce, the ever-growing debt creates a downward spiral for the consumer and aggregately, the economy.

One advantage of the present invention is that the consumer can conduct commercial transactions as a merchant anywhere where there is an available means of communications such as telephone lines, faxes, mail, cyberspace and electronic commerce such as internet, and satellite transmissions.

Another advantage of the present invention is that small scale home industries will be greatly benefited by having the ability to accept payment over the phone and delivering products by mail.

Still yet another advantage of the present invention is to provide, in combination with a plurality of credit and debit facilities and other non-cash consumer spending media, a method and process for the household consumer to accept non-cash medium of payment thereby enabling consumers to engage in commercial transactions as merchant or entrepreneurs. The combined features are not currently available in the market and are not likely to be commercially possible without the synergistic effect of the combination of the two processes.

The object of the present invention is to provide a method for storing, processing, merging, and managing commercial transactions whether these transactions are purchases of goods and services or sales of goods and services.

Yet another object of the present invention is to provide a method for evaluating credit risk and profitability of consumer applications.

Yet still another object of the present invention is to provide a method to allow an account holder to select from several payment options which include (1) investing sales proceeds in various investment accounts and (2) managing and reporting account activities and performance.

Yet still another object of the present invention is to provide, for people working from home, a process that will enable average consumers to learn thousands of different ways to become entrepreneurs and sell goods and services no matter where they are and what they do for a living.

This new invention has significant implications. Payment methods have long been trying to displace the use of cash. MasterCard Inc., for example, uses the logo "The Future Of Cash" for its credit card products. Indeed, these payment methods have significantly displaced cash. As a result of such success, there is a rush to develop existing payment methods. Inventors and companies are vigorously enhancing that one feature (single-directional payment flow) of existing payment methods with the hope of displacing cash even more.

These and further objects of the present invention will become apparent to those skilled in the art after a study of the present disclosure of the invention.

DETAILED DESCRIPTION OF THE INVENTION

The consumer/merchant facility is a financial process that can be offered to the general public for use in two complementary ways. The first, most common, usage is as a purchasing method using, for example, a credit/charge card or a debit card. The second usage is as a payment acceptance method. This method allows a consumer/merchant facility holder to accept payments using credit/charge card or debit cards. The method may come in the form of, but is not limited to, a card such as a credit card, a charge card, a debit card, a smart card, or similar manifestation of a line facility. In addition, the method provides for various payment options which include traditional payment methods such as cheques, direct credit to a bank account, investment in several investment options, or retention of the payment in the account as a credit balance.

Figure 1:
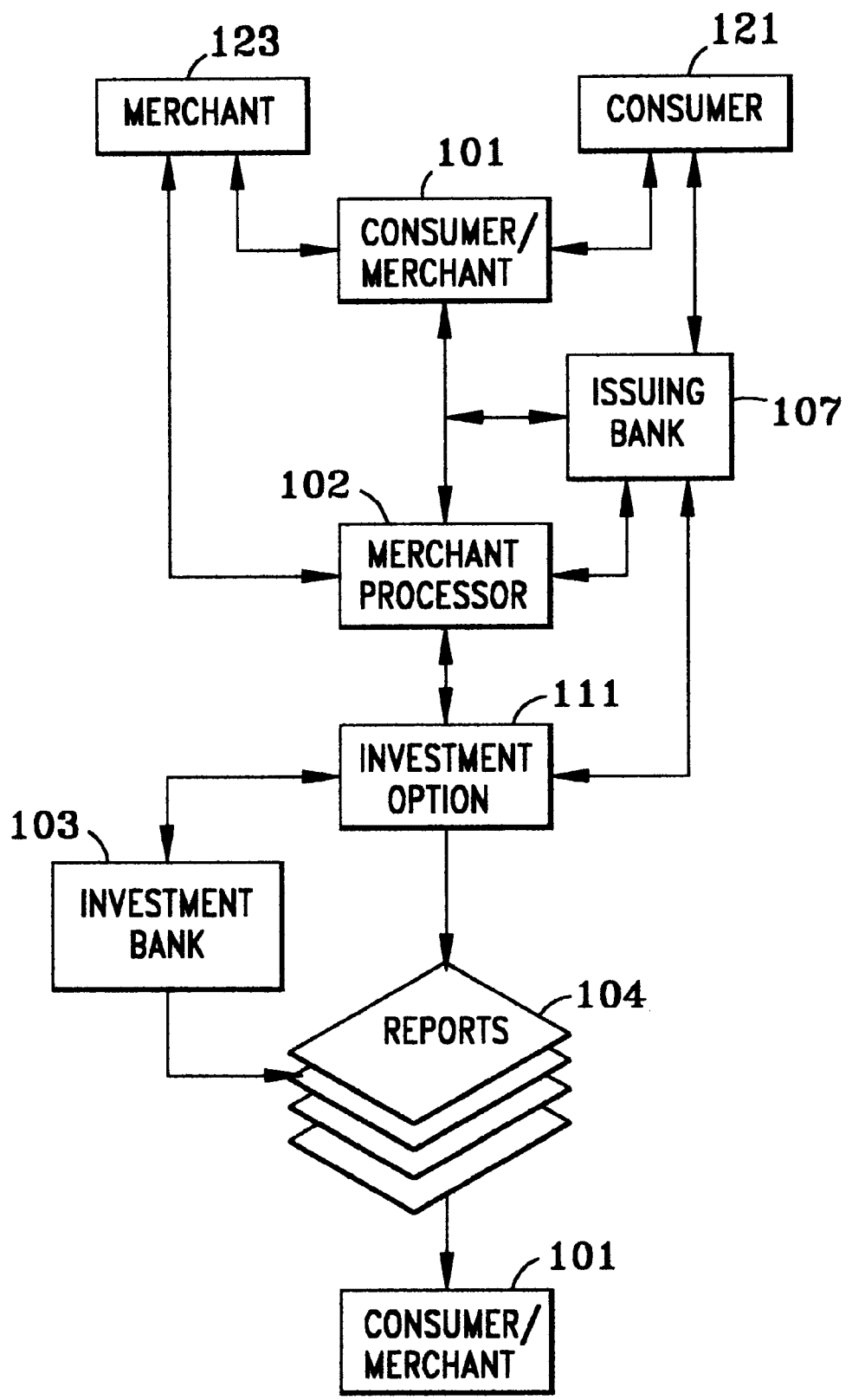
FIG. 1 is an overview of the general flow of transactions and the major components of the process.

Referring now to FIG. 1, the method of the instant invention can be viewed as a flow of transactions that covers six major transaction originators: consumer 121, merchant 123, account holder 101 (herein referred to as the consumer/merchant), issuing bank 107, merchant processor 102, and investment bank 103. The first two, consumer 121 and merchant 123 are the third parties that consumer/merchant 101 transacts with. Consumer/merchant 101 is simply a consumer with a consumer/merchant facility issued by issuing bank 107. Issuing bank 107 is any bank that issues a consumer/merchant facility. There can be multiple issuing banks 107. Merchant processor 102, usually transparent to a credit/charge card holder, is the processor of transactions. Finally, investment bank 103 provides the investment products in which the proceeds of the account can be invested if investment option 111 is elected. Reports 104 are prepared and sent to consumer/merchant 101.

Figure 2:
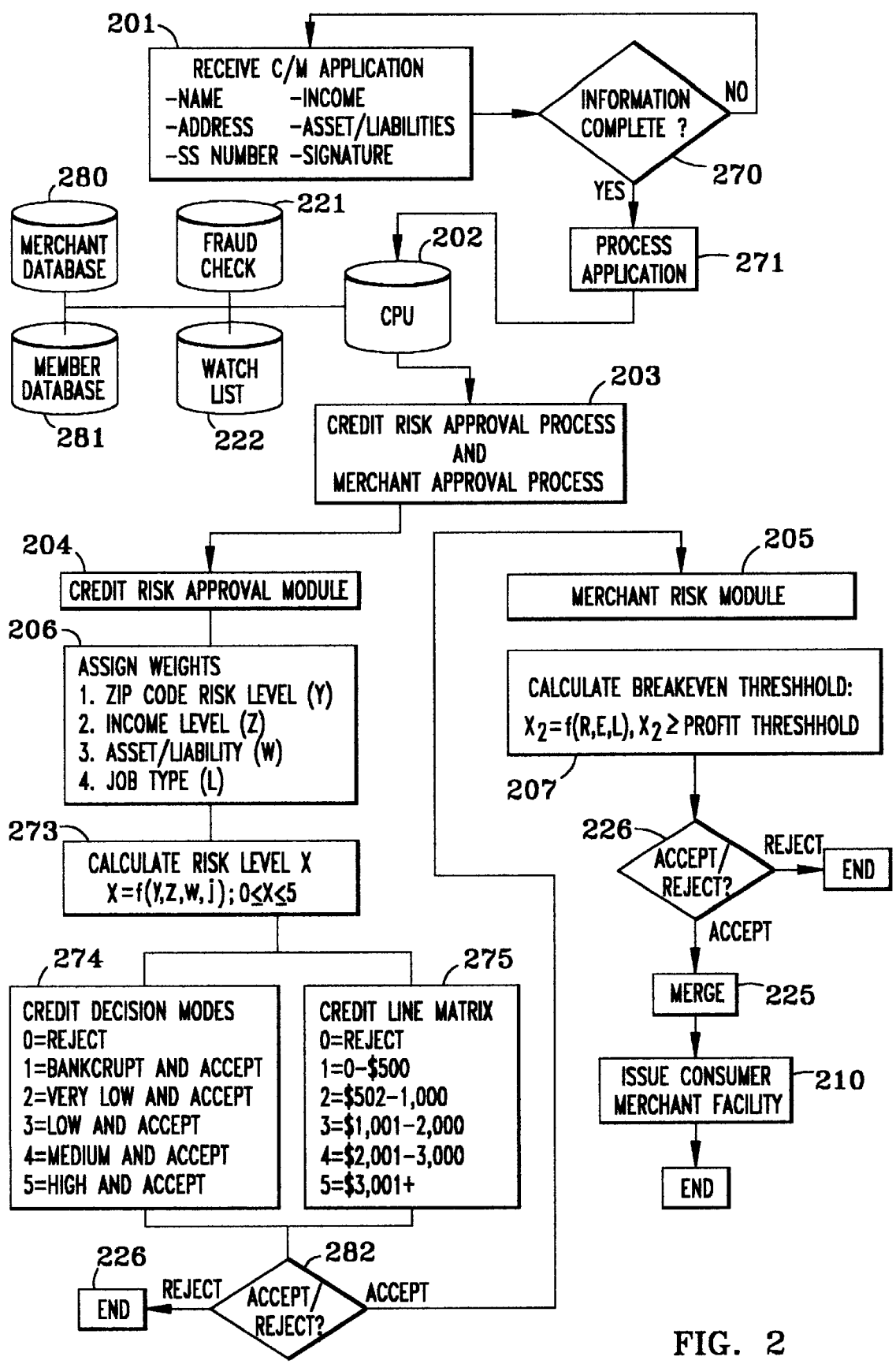
FIG. 2 is a flowchart illustrating the process for screening, evaluating, and selecting customers to be extended the consumer/merchant facility and the evaluation of credit risk, profitability, and assignment of credit line thereof.
Figure 3:
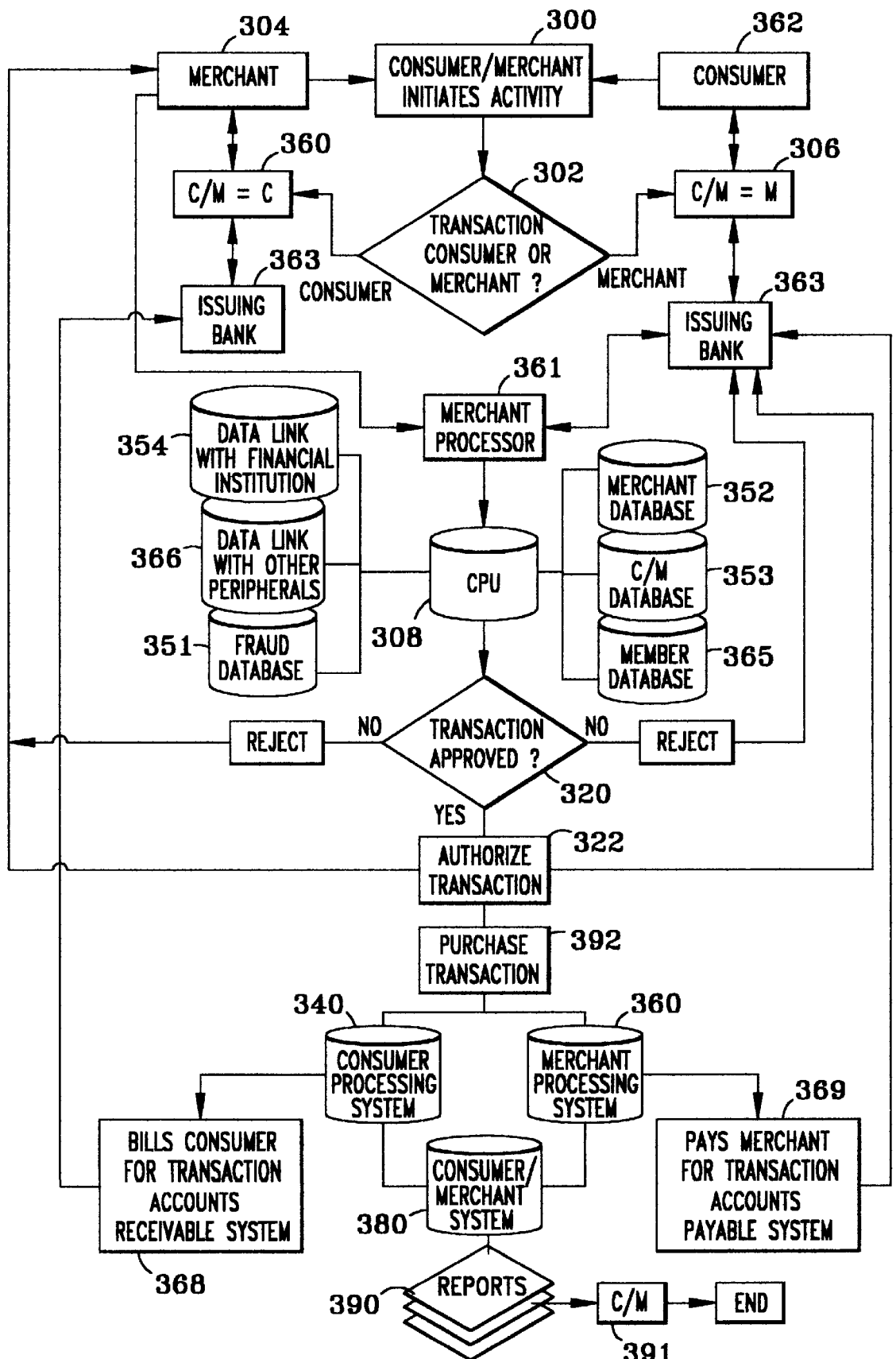
FIG. 3 is a flowchart illustrating the processes that receive, acknowledge, capture, store, and process the transactions, whether purchase of goods and services or sale of goods and services.
Figure 4:
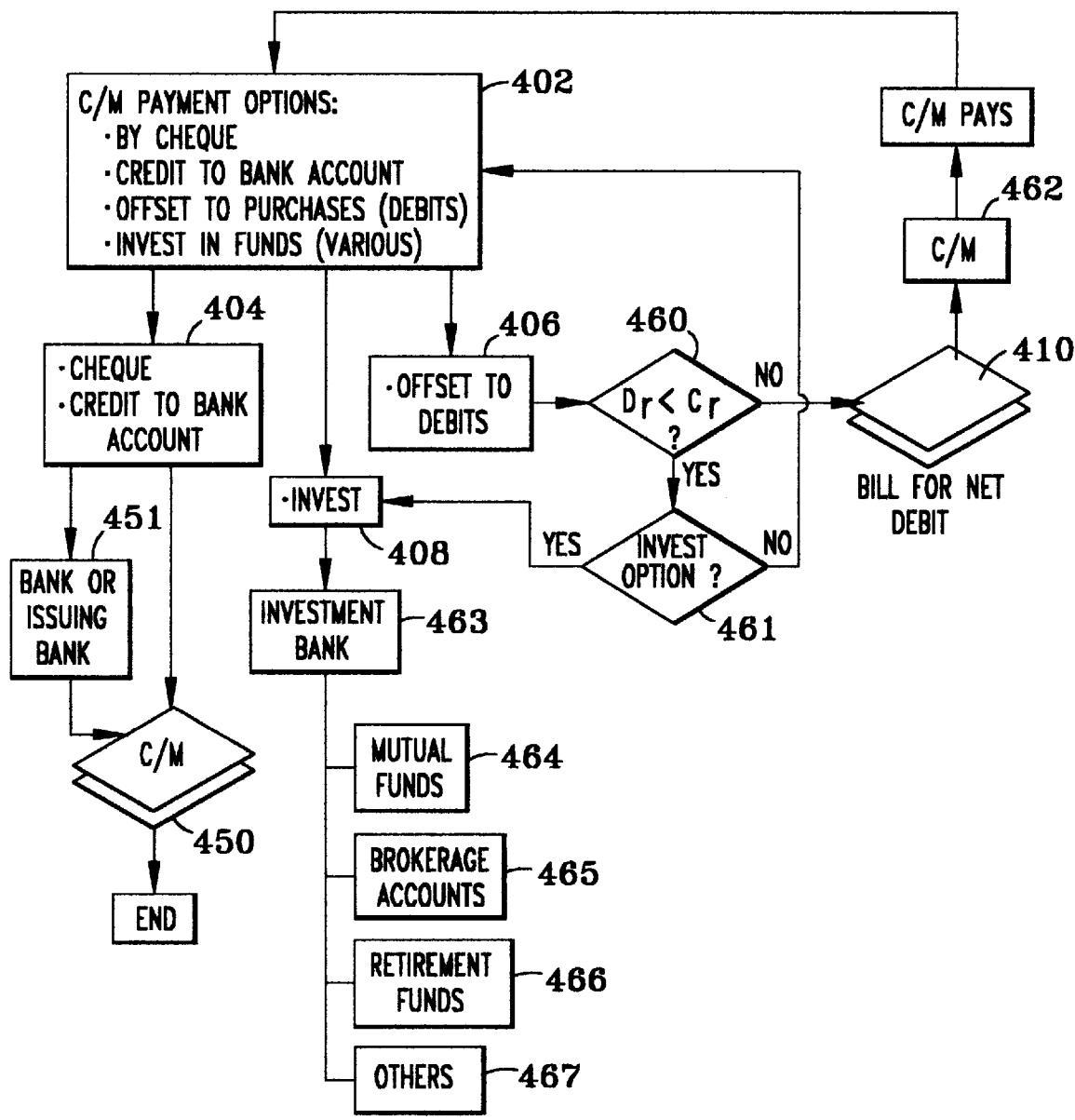
FIG. 4 is a flowchart that illustrates the method for the various payment options which include a plurality of investment options and management of the investment account.
Figure 5:
FIG. 5 illustrates the preferred embodiment of a statement report format of the activities of the account.
Figure 5:

There are several parts to the consumer merchant process, each illustrated in FIGS. 2–5. The first part, FIG. 2, is the method of screening and selecting accounts. The second part, FIG. 3, is a method to receive, acknowledge, capture, process, and store transactions. The third part, FIG. 4, is method to execute the account holders' payment selection that includes investment of the proceeds into investment accounts. Finally, the fourth part, FIG. 5, is the method of reporting the transactions.

Referring now to FIG. 2, the first part of the process is selection of accounts to be granted the consumer/merchant facility. The application is received and reviewed for completeness 201 of the required minimum information which generally includes the name, address, social security number, signature, and optionally, may include income and asset/liability declaration. If the information is complete 270 then it is ready for processing 271. In the preferred embodiment, application information is captured in central processing unit 202 as an account and matched against several databases that house merchant information 280 and member information 281 containing such parameters as social security number for comparison to a credit bureau report and zip code for alerting for high fraud occurrences in these zip codes. Other databases are used for housing fraud parameters such as prior fraud history 221 and U.S. Government-initiated watch list information 222. Once the application passes initial processing including fraud screen as above, the application is then evaluated 203 against two models.

The method of assessing credit risk, credit risk model 204, is represented by formula 273:

$$X=f(Y,Z,W,J)$$

Where X, in the preferred embodiment, is the decision between $0 \leq x \leq 5$; Y=Zip Code risk assignment; Z=Income level risk assignment; W=Asset/Liability risk assignment; J=Job risk assignment.

Weights are assigned 206 to each of parameters Y, Z, W, and J, and a risk level is calculated by formula 273 and a value assigned to X based on the combination of risk factors. Possible values of X indicate whether or not credit should be extended 274 and the credit limit 275 offered as follows:

0 is reject mode;

1 is accept with $0 to $500 in credit limit;

2 is accept mode with $501–$1,000 credit limit;

3 is accept mode with $1,001 to $2,000 credit limit;

4 is accept mode with $2,001 to $3,000 credit limit;

5 is accept mode with $3,001 to no limit.

It is understood that line assignments 275 may vary according to the issuer's financial preference and variable criteria 274 may vary depending on changes in preferred economic indicators.

If the application is accepted 282 by Credit Risk Approval Module 204, it goes forward for evaluation by Merchant Risk Approval Module 205. Module 205 determines the commercial value of the account based on the projected revenues, costs, and risk associated with the account and is expressed in formula 207 with detail as follows:

$$X_2=f(R,E,L); X_2=(R-E)\cdot(1-L)$$

$X_2$ is the projected profits;

$X_2 \geq$ desired profitability level;

$R=M+t(V)+I_i$

E=Fixed Cost+Variable Cost (V)

L=Loss reserve ratio where;

M is the annual maintenance or membership fees, t is the transaction fees charged per volume processed, V is charge volume expected to be generated by account, I represents the fees associated with the utilization of one or more of the investment options, E represents the expenses composed of fixed costs and variable costs of processing transactions and managing the account.

For example, if the break-even profit is $50, and a membership fee of $50 is charged per year for the product, and the customer is expected to generate sales of $2,000 for the first year with transaction fees of $0.04/volume processed, and invests all proceeds to a mutual fund account with utilization fees of $0.035/volume processed, and fixed cost per account is $25 and variable cost of processing each transaction is $0.35, and investment cost is $2 per transaction, with loss reserve ratio of 0.

$$X_2=\$50+0.04(\$2000)+0.035(\$2000)-\$25-\$0.35(1)-\$2.0=\$172.65$$

$X_2$=172.65>50; therefore accept application.

Once the application passes through the two modules, the account is either accepted or rejected 226. If accepted, the account is set up in the database 225 and the facility is issued to the applicant 210.

Referring now to FIG. 3, an account that is set up is ready to process transactions. These transactions may be purchases (disbursements) made by the account owner, or sales (receipts) made by the account owner. The account owner initiates the transactions by either purchasing or selling 300. The first step in this system is to identify whether the consumer/merchant is executing a transaction as "consumer" or "merchant" 302. If it is a consumer transaction (purchase) 360, merchant 304 executing the sale to the account owner submits the transaction to merchant processor 361. If it is a sale, account owner 362 acts as merchant 306 and submits the transaction for processing through issuing bank 363. Submissions of transactions may be done in various ways which are all prior art and currently in use, such as paper (form) submission, electronic data submission, phone-in, and fax submissions. Processing of merchant transactions is also old art and currently used most popularly by credit and charge card processes. What is unique in this new process is that there is an additional database for consumer/merchant account 353 processed in central processing unit 308. These accounts are neither exclusively merchant nor exclusively consumers and will contain information characteristic of merchant 352 and consumer 365. They are both consumer and merchant and represent a new set of account bases not currently existing. This feature is extraordinary in that databases are normally built either for consumer characteristics or for merchant characteristics. Here, the database embodies both.

Once the transaction has been submitted for processing, the information is captured in central processing unit 308 and run against several screening modules. If the purchaser is a card member the purchaser's account (member database) information is retrieved and evaluated for status and fraud warnings 351. Second, the merchant file 352 is retrieved and evaluated. If the submittor is a consumer/merchant account, database 353 for consumer/merchants (C/M database) is retrieved for the specific account and evaluated. In addition, the transaction is processed against other data systems 354 and 366 depending on the linkage used by the submitter. The Merchant Processor approves or denies the transaction after performing the above procedures 320. If the transaction is approved, the merchant is given an authorization for future reference 322. This portion of the process is old art and currently in use.

A consumer/merchant account owner will therefore have two types of transactions occurring in its basic account. First, it has the purchases, which are processed similarly to other purchases. Second, there are the sales transactions which are processed similarly to other sales transactions. The next step is where this invention departs from all prior art, where any such purchase or sale is processed 392. A purchase transaction system, represented here as accounts receivable system 368 and consumer processing system 340, is merged with the sales transactions, represented here as accounts payable system 369 and merchant processing system 360, into single datafile, consumer/merchant system 380, for each account within a database. Consumer/merchant system 380 may now be processed into a more familiar form such as report 390 similar to a bank statement that shows incoming finds (deposits) and outflow of finds (withdrawals), except that here, incoming finds are proceeds of sales and outflow of finds are purchases made using facility 390. Report 390 is sent to consumer/merchant 391.

The third part is a process to execute the account holder's payment selection that includes investment of the proceeds into investment accounts. There are several ways that an account holder may want to be paid 402—by cheque 404, by direct credit to a bank account whether or not the account is in the issuing bank 451, by offset to the purchases (debits) 406, by letting it remain a credit to the account 404, or by investing it to the available investment options 408. If the account holder elects to be paid by cheque, a cheque is cut and mailed to the account address 450. This is old art. The account holder may elect for a direct credit to a bank account 404 and bank 451, also old art.

The account holder may opt to offset the sales (credits) to the purchases (debits) 406. This process is new and unique to this invention. If debits are less than credits 460, the account holder may choose to invest the remaining funds 461. If not, a bill for the remainder is prepared 410 and sent to the account holder (consumer/merchant) 462, at which time the process can begin again 402.

The account holder may also opt to invest the proceeds 408 to investment options made available by investment bank 463. This feature is unique to this new invention. The ability to invest directly out of the proceeds of a sale is a major incentive for consumers to engage in entrepreneurial activities. Investment options can include, but are not limited to, mutual funds 464, brokerage accounts 465, retirement funds 466, and others 467. A report of account activity is prepared for the consumer/merchant.

Referring now to FIG. 5, after all the transactions are merged into one file they are reported to the account holder. The transactions are reported in at least two ways. The first is a detailed report of specific transactions 501. The second is the report on the placement of the proceeds and the activities within such placement 503.

It is also thought that described and claimed herein and the uses expressly noted and suggested inferentially and otherwise, and the various methods of use and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In a consumer to consumer debiting and crediting system wherein there is a credited consumer and a debited consumer and wherein said debited consumer and said credited consumer, as consumers establish multi-directional accounts, perform financial transactions including debiting and crediting said account, and direct account credits to investment vehicles, said investment vehicles comprising mutual funds, brokerage accounts, and retirement accounts, a method for consumers to accept account credits in payment for goods and services comprising:

screening and selecting said consumers for eligibility for said multi-directional accounts;

establishing said multi-directional accounts;

establishing the direction of said account credit to said investment account;

receiving, acknowledging, capturing, processing, and storing said account credits and debits;

directing, by said credited consumer, said account credits to at least one of said investment vehicles; and reporting said financial transactions to said consumers.

2. The method as in claim 1 wherein said screening and selecting comprises:

inputting information supplied by said consumer about said consumer comprising name, address with zip code, social security number, signature, and income and asset/liability declaration is complete;

assigning a zip code risk level by comparing said information with a zip code database for alerting for high fraud occurrences in these zip codes;

assigning an income level risk level based on said income declaration information;

assigning an asset/liability risk level based on said asset/liability declaration information;

assigning a job type risk level based on said consumer-supplied information;

calculating credit risk level by algorithmically combining said zip code risk level, said income risk level, said asset/liability risk level, and said job type risk level;

assigning a credit decision value based on said algorithmic combination of said risk levels;

assigning a credit line value based on said algorithmic combination of said risk levels;

using credit decision value to determine whether or not to establish said credit account;

inputting transactional information from said consumer comprising projected revenue and fixed and variable transactional costs and loss reserve ratio;

computing projected profits according to the relationship $X2=f(R,E,L)$; $X2=(R-E)\cdot(1-L)$ where X2 represents said projected profits, R represents said projected revenue, E represents said fixed and variable costs, and L represents said loss reserve ratio;

comparing said projected profits to a desired profitability level; and issuing consumer/merchant facility if projected profits are greater than or equal to said desired profitability level and said credit decision value indicates that said credit account should be established.

3. The method as in claim 1 wherein said receiving, acknowledging, capturing, processing, and storing said account credits and debits comprises:

determining whether said consumer is executing a transaction as "consumer" or "merchant";

executing said transaction to said consumer if said transaction is a purchase or to said merchant if said transaction is a sale by submitting said transaction to a merchant processor;

submitting said transaction for processing through an issuing bank;

processing said transaction by accessing databases comprising information from financial institutions, fraud records, merchant information, consumer/merchant joint information, consumer information, and said merchant processor information and deciding whether or not to authorize said transaction;

authorizing said transaction; and crediting (debiting) said transaction to (from) said account if said transaction is a sale (purchase).

4. The method as in claim 3 wherein said processing of said transaction by accessing said databases comprises:

capturing said information in a central processing unit;

retrieving said consumer's account information from either a merchant database, a consumer/merchant database, or a consumer database;

evaluating said consumer's account information for status and fraud warnings;

evaluating said transaction against other transactional-dependent databases; and making a rejection or acceptance of said transaction using said consumer's account evaluation and said transaction evaluation information.

5. In a consumer to consumer debiting and crediting system wherein there is a credited consumer and a debited consumer and wherein said debited consumer and said credited consumer, as consumers establish multi-directional accounts and perform financial transactions including account debit and credit, a method for consumer purchasing combined with payment acceptance comprising:

screening and selecting said consumers for eligibility for said multi-directional accounts;

establishing said multi-directional accounts;

receiving, acknowledging, capturing, processing, and storing said account credits and debits;

directing, by said credited consumer, said account credits towards an investment vehicle; and reporting said financial transactions to said consumers.

6. The method as in claim 5 wherein said screening and selecting comprises:

inputting information supplied by said consumer about said consumer comprising name, address with zip code, social security number, signature, and income and asset/liability declaration is complete;

assigning a zip code risk level by comparing said information with a zip code database for alerting for high fraud occurrences in these zip codes;

assigning an income level risk level based on said income declaration information;

assigning an asset/liability risk level based on said asset/liability declaration information;

assigning a job type risk level based on said consumer-supplied information;

calculating credit risk level by algorithmically combining said zip code risk level, said income risk level, said asset/liability risk level, and said job type risk level;

assigning a credit decision value based on said algorithmic combination of said risk levels;

assigning a credit line value based on said algorithmic combination of said risk levels;

using credit decision value to determine whether or not to establish said credit account;

inputting transactional information from said consumer comprising projected revenue and fixed and variable transactional costs and loss reserve ratio;

computing projected profits according to the relationship $X2=f(R,E,L)$; $X2=(R-E)\cdot(1-L)$ where X2 represents said projected profits, R represents said projected revenue, E represents said fixed and variable costs, and L represents said loss reserve ratio;

comparing said projected profits to a desired profitability level; and issuing consumer/merchant facility if projected profits are greater than or equal to said desired profitability level and said credit decision value indicates that said credit account should be established.

7. The method as in claim 5 wherein said receiving, acknowledging, capturing, processing, and storing said account credits and debits comprises:

determining whether said consumer is executing a transaction as "consumer" or "merchant";

executing said transaction to said consumer if said transaction is a purchase or to said merchant if said transaction is a sale by submitting said transaction to a merchant processor;

submitting said transaction for processing through an issuing bank;

processing said transaction by accessing databases comprising information from financial institutions, fraud records, merchant information, consumer/merchant joint information, consumer information, and said merchant processor information and deciding whether or not to authorize said transaction;

authorizing said transaction; and crediting (debiting) said transaction to (from) said account if said transaction is a sale (purchase).

8. The method as in claim 5 wherein said processing of said transaction by accessing said databases comprises:

capturing said information in a central processing unit;

retrieving said consumer's account information from either a merchant database, a consumer/merchant database, or a consumer database;

evaluating said consumer's account information for status and fraud warnings;

evaluating said transaction against other transactional-dependent databases; and making a rejection or acceptance of said transaction using said consumer's account evaluation and said transaction evaluation information.

9. The method as in claim 5 wherein said investment vehicle is at least one selected from the group consisting of; mutual funds, brokerage accounts, and retirement funds.

* * * * *